United States Patent [19]
Kader

[11] 3,985,490
[45] Oct. 12, 1976

[54] APPARATUS FOR EXTRUDING A HOMOGENEOUS TUBULAR LENGTH OF SOFT THERMOPLASTIC MATERIAL

[75] Inventor: Reiner Kader, St. Augustin, Germany

[73] Assignee: Mauser Kommanditgesellschaft, Cologne, Germany

[22] Filed: June 4, 1974

[21] Appl. No.: 476,304

[52] U.S. Cl. .................................. 425/381; 425/466
[51] Int. Cl.² .......................................... B29D 23/04
[58] Field of Search ........... 425/381, 380, 466, 467, 425/4 C, 81.7 C, 461, 33.1, 131.1, DIG. 206; 72/265, 266, 273; 264/209, 176 R

[56] References Cited
UNITED STATES PATENTS

| | | | |
|---|---|---|---|
| 2,736,921 | 3/1956 | Mulbarger et al. .......... | 425/131.1 X |
| 3,099,860 | 8/1963 | Schippers.................... | 425/380 X |
| 3,345,690 | 10/1967 | Hagen................... | 425/145 |
| 3,386,132 | 6/1968 | Fischer .................... | 425/381 |
| 3,479,422 | 11/1969 | Zavasnik................... | 425/4 C X |
| 3,522,629 | 8/1970 | Langecker .................. | 425/381 X |
| 3,664,781 | 5/1972 | Wioman....................... | 425/131.1 X |
| 3,690,806 | 9/1972 | Kovacs........................ | 425/467 X |
| 3,801,254 | 4/1974 | Godtner..................... | 425/380 |

FOREIGN PATENTS OR APPLICATIONS

| | | | |
|---|---|---|---|
| 600,489 | 1960 | Canada ............................... | 425/380 |
| 867,379 | 7/1941 | France ............................... | 425/382 |
| 1,962,635 | 1971 | Germany ............................ | 425/381 |

*Primary Examiner*—Francis S. Husar
*Assistant Examiner*—Mark Rosenbaum
*Attorney, Agent, or Firm*—George J. Netter

[57] ABSTRACT

An improved extrusion apparatus for extruding a tube of soft thermoplastic material of improved consistency and homogeneity is provided. A double walled piston having an annular chamber between the inner and outer annular walls thereof is mounted for sliding longitudinal movement between the interior wall of the apparatus housing and a longitudinal core disposed in the housing. The thermoplastic material fed into the apparatus first enters the annular piston chamber which, even during upward and downward movement of the piston, remains constant.

6 Claims, 5 Drawing Figures

APPARATUS FOR EXTRUDING A HOMOGENEOUS TUBULAR LENGTH OF SOFT THERMOPLASTIC MATERIAL

The present invention relates to the art of extruding thermoplastic materials.

More particularly, the present invention is directed to an improved extruder apparatus for extruding a length of soft thermoplastic in the form of a tube. Such a thermoplastic tube is sometimes referred to as a "parison." The parison formed by the extrusion apparatus of the present invention may be fed, for example, from the extrusion apparatus to a position between mating die halves of a suitable blow-molding machine. In such a blow-molding machine (which forms no part of the present invention) the parison may be blown against the interior walls of the mold to form a desired product, such as a plastic container for example.

Prior art extrusion apparatuses for extruding soft thermoplastic tubes or parison typically comprise a cylindrical housing having a longitudinal core extending through the central portion of the housing. Soft, heated thermoplastic material is fed into the housing to fill the annular space between the longitudinal core and the interior wall of the housing. Thereafter, a piston is moved downwardly to force the soft thermoplastic through an annular space in the bottom of the housing to form the parison.

As the thermoplastic material is fed into the housing in such prior art extrusion apparatuses, it is divided by the longitudinal core, flows around the core and then flows downwardly into the annular space between the core and the housing. During this process the thermoplastic material loses its homogeneity. This is a disadvantage which may create varying thicknesses in the wall of the parison and varying thicknesses and structural weaknesses in the product (e.g., a plastic container) which is subsequently blow-molded from the parison.

This disadvantage, loss of homogeneity of the plastic material is exacerbated when the piston in the extrusion apparatus moves downwardly in the annular channel between the longitudinal core and the housing of the prior art extrusion apparatuses, because during the downward stroke of the piston the annular cross-sectional area of the annular channel and the length of the channel are changed. Accordingly, the thermoplastic material does not have an opportunity to come to rest and re-homogenize before it is extruded from the apparatus.

It has not heretofore been possible to obtain sufficient homogenization of such thermoplastic material in the prior art extrusion apparatuses because none have been designed to permit the soft thermoplastic material to set in the apparatus for a sufficient time to re-homogenize prior to being extruded therefrom. In other words, none of the prior art extrusion apparatuses permit the thermoplastic material fed thereto to reside for a predetermined time before the cross-sectional area or the length of the annular chamber therein is changed.

In view of the foregoing, it is an object of the present invention to provide an improved extrusion apparatus (sometimes referred to as an "accumulator head") wherein the annular space which receives the soft thermoplastic material is maintained constant in cross-sectional and longitudinal areas to permit the material therein to set or reside for a predetermined time in order to ensure homogenization thereof.

The foregoing and other objects of the present invention have been realized by providing a double walled or double shell piston. The double walled piston includes an inner and outer wall which define an annular chamber therebetween. This annular piston chamber opens downwardly toward the annular space or ring nozzle of the apparatus through which the material is subsequently extruded. In addition, a longitudinal channel is formed in the outer surface of an outer wall of the piston directly adjacent to each opening in the housing through which thermoplastic material is fed. This longitudinal channel is closed at the bottom thereof, but open at the top to provide communication between the channel and the annular piston chamber. An annular storage chamber is disposed between the double walled piston and the annular space or ring nozzle at the bottom of the apparatus. In addition, one or more distributor members is provided (in one preferred embodiment of this invention) to ensure an even downward flow of the thermoplastic material in the apparatus. In a second embodiment the structure of the upper portion of the annular storage chamber in the piston is shaped to ensure downward flow of the thermoplastic material.

By virtue of the direct supply of thermoplastic material through the annular channel in the double walled piston, and the fact that the annular piston chamber remains constant (during upward and downward movement of the piston) a sufficiently long residence or set time of the thermoplastic material in the apparatus is ensured, thereby ensuring maximum homogeneity of the material.

The foregoing and numerous other objects and attendant advantages of the present invention will become apparent from a review of the following description of preferred embodiments of the invention, in conjunction with the drawings.

Figure 1:
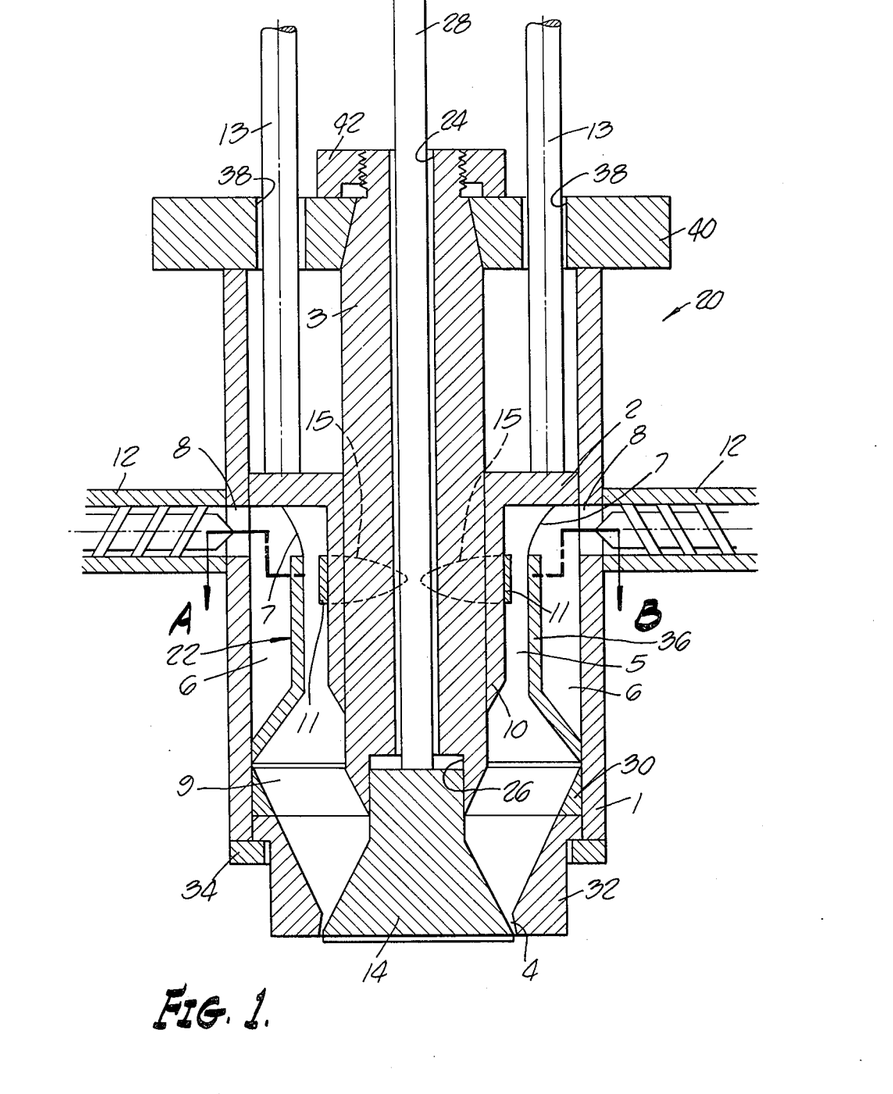
FIG. 1 is a sectional elevation view of a preferred embodiment of the extrusion apparatus of the present invention showing the double walled piston of the apparatus in its lowermost position.
Figure 2:
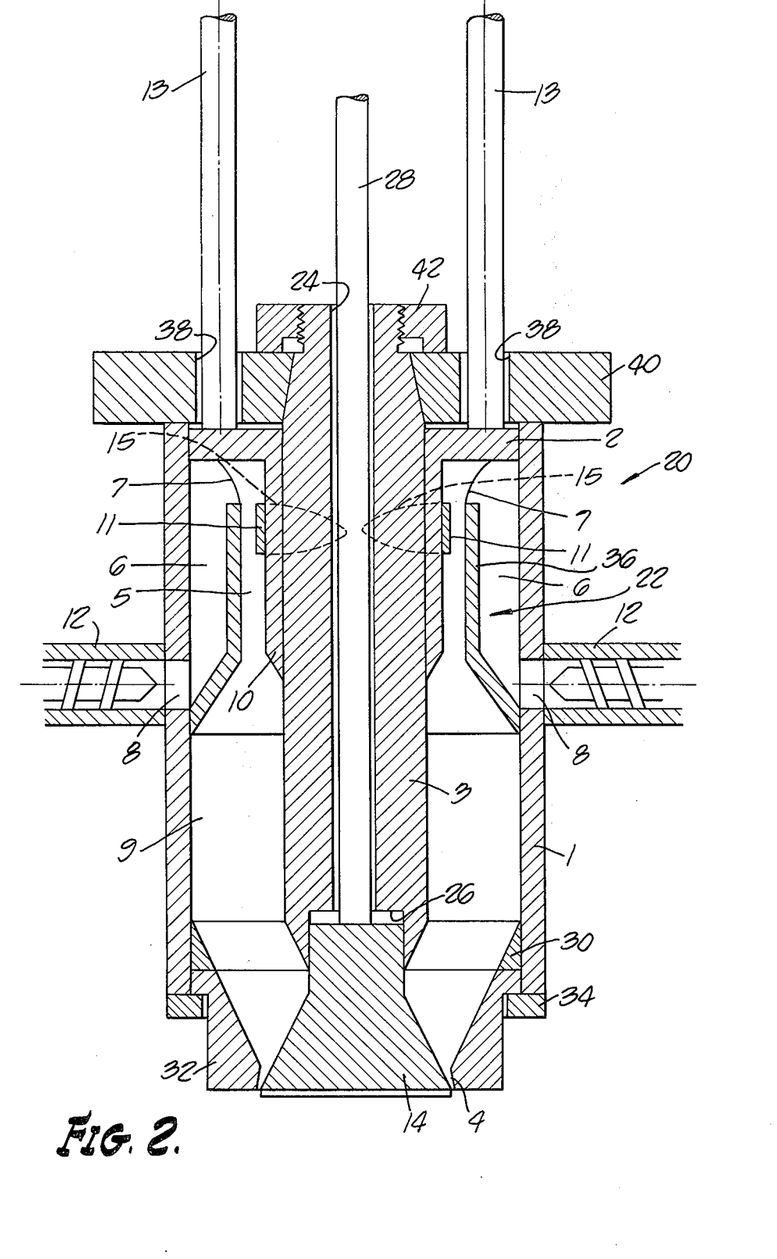
FIG. 2 is a sectional elevation view of the apparatus shown in FIG. 1, with the piston in its uppermost position.
Figure 3:
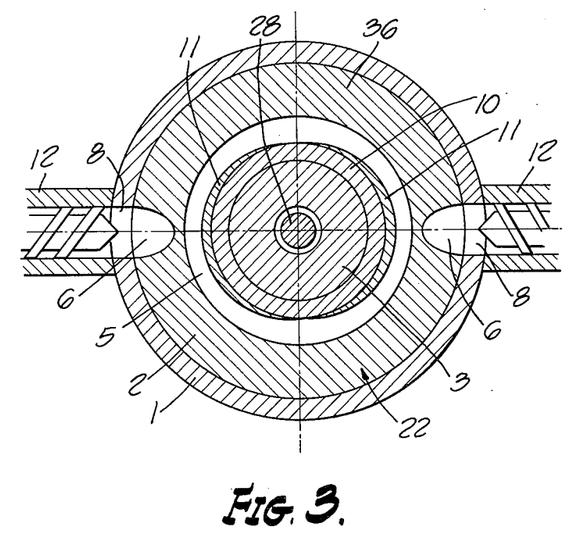
FIG. 3 is a sectional plan view taken along the line A–B of FIG. 1 and looking in the direction of the arrows.

Referring now to the preferred embodiment of the extrusion apparatus of the present invention shown in FIGS. 1–3, it will be seen that the extrusion apparatus 20 includes a generally cylindrical housing 1, a longitudinal core 3 extending substantially co-axially through the center of the housing 1 and a double walled piston 22 slidably mounted for longitudinal sliding movement along the outer surface of the core 3.

The longitudinal core 3 is provided with a central longitudinal bore 24 extending substantially co-axially therethrough. The longitudinal bore 24 communicates with an enlarged, downwardly opening cavity 26 in the lower end of the core 3. A control shaft 28 is slidably disposed in the bore 24 and is connected at its lower end to the upper portion of a mandrel 14.

The upper end portion of the mandrel 14 is generally cylindrical and is slidably disposed in the cavity 26 in the lower end of the core 3. The lower portion of the mandrel 14 is of generally truncated cone-shaped. A two-piece die member 30, 32 is mounted in the lower end of the cylindrical housing 1 by means of a suitable annular retaining member 34. The upper die piece 30 and the upper portion of the lower die piece 32 are disposed within the lower portion of the cylindrical housing 1. The lower portion of the lower die piece 32 extends downwardly and outwardly through the bottom of the housing 1.

As shown in FIGS. 1 and 2, the interior peripheral wall of the die 30, 32 is generally truncated cone-shaped, except at the very lower end thereof to provide an annular storage chamber 9 between the interior die wall and the mandrel 14.

It will be noted that there is an annular space 4 defined by the lower outer peripheral surface of the mandrel 14 and the lower inner peripheral surface fo the die member 32. This annular space 4 forms a ring nozzle through which soft thermoplastic material may be extruded to form a tubular length of thermoplastic material. It will be appreciated that the thickness of the tubular length of material extruded through the annular space or ring nozzle 4 may be increased by moving the control rod 28 and the mandrel 14 downwardly; and the thickness of the tubular material may be decreased by moving the control rod 28 and the mandrel 14 upwardly.

The double walled piston 22 of the extrusion apparatus 20 includes an upper annular portion 2 (see FIGS. 1 and 2), an inner, axially extending wall 10, and a relatively thick, annular axially extending outer wall 36 (see FIG. 3). An annular chamber 5 is formed between the inner piston wall 10 and the outer piston wall 36.

As shown in FIGS. 1 and 2, the double walled piston 22 is mounted for longitudinal sliding movement in the cylindrical housing 1. The piston is movable between its uppermost position shown in FIG. 2 and its lowermost position shown in FIG. 1 by means of a plurality of piston rods 13,13. The piston rods 13,13 extend through openings 38,38 in an upper cover member 40. Thus, it will be appreciated that the double walled piston 22, which is attached to the lower ends of the piston rods 13,13, is confined to longitudinal sliding movement. Any attempt to rotate the piston in the housing 1 will be resisted by means of the piston rods 13,13 which extend through the openings 38,38 in the upper cover member 40.

It will also be noted, with reference to FIGS. 1 and 2, that the core member 3 is fixedly mounted relative to the housing 1 by means of cooperating external and internal screw threads on the upper portion of the core 3 and on a mounting member 42, respectively.

A pair of diametrically opposed, screw-type extruders or conveyors 12,12 are connected to the housing 1, at about the central portion thereof, and communicate with the interior of the housing 1 via openings 8,8 in the housing 1.

A pair of diametrically opposed, longitudinal channels 6,6 are provided in the exterior surface of the outer wall 36 of the piston 22. These channels 6,6 are in communication with openings 8,8 and the screw extruders 12,12.

As shown in FIGS. 1 and 2, an opening or passage 7 is provided at the upper end of each channel 6 to provide communication between each extruder 12, its associated openings 8, its associated channel 6, and the annular piston chamber 5.

It will be noted from a comparison of FIGS. 1 and 2 that the length of the stroke of piston 22 is substantially equal to the length of the longitudinal channels 6,6. It will be further noted, from viewing FIG. 2, that the size of the annular storage space 9 increases from a minimum volume when the piston 22 is in its lowermost position (FIG. 1) to a maximum volume when the piston is in its uppermost position (FIG. 2).

A pair of generally arc-shaped semi-circular distributor members 11,11 are affixed to the outer surface of the inner piston wall 10 for the purpose of ensuring even downward flow of the thermoplastic material fed into the annular piston chamber 5. As shown in broken lines in FIGS. 1 and 2, the top and bottom edges 15,15 of each of the distributors 11 taper toward one another and terminate in a point at a position spaced substantially 90° from the inlet openings 8,8.

In operation, the double walled piston 22 is initially in its lowermost position shown in FIG. 1. The screw-type conveyors or extruders 12,12 are operated to feed soft, heated thermoplastic material through the openings 8,8 to fill the annular piston chamber 5, the storage chamber 9, and the longitudinal channels 6,6.

As the soft thermoplastic material enters the upper portion of the annular piston chamber 5, through the openings 7,7 the material entering through each opening 7 will be divided to flow around either side of the inner piston wall 10. The material from each of the extruders 12 and each of the openings 8 will join one another at two diametrically opposed areas which are spaced substantially 90° from the inlet openings 8,8. The distributors 11,11 will aid in ensuring relatively constant downward flow of the thermoplastic material in the annular chamber 5 to ensure that the material becomes a homogeneous mixture. This is accomplished because the size of the distributors 11 decreases from a maximum size at the areas where the thermoplastic material enters the annular chamber 5 and begins its downward flow, to a minimum size at the diametrically opposed areas spaced 90° from the inlet openings 8,8, where the material from each extruder 12 join.

When the annular piston chamber 5, the storage chamber 9 and the channels 6,6 have been filled with thermoplastic material, the introduction of additional thermoplastic material from the screw extruders 12,12 into the cylindrical housing 1 then forces the piston 22 upwardly to the uppermost position shown in FIG. 2. As the piston 22 moves upwardly, the storage space 9 is increased, as will be seen by a comparison of FIGS. 1 and 2.

When the double walled piston 22 has reached its uppermost position (FIG. 2) a suitable switch (e.g., a limit switch, conventional per se, not shown) is actuated to operate a suitable driving mechanism (not shown) to drive the piston rods 13,13 and the double walled piston 22 downwardly.

As the piston 22 moves downwardly, it will force the soft thermoplastic material in the lower portion of the storage chamber 9 through the annular opening or ring nozzle 4 to extrude a predetermined length of soft thermoplastic material therefrom. As noted above, this length of soft thermoplastic material is sometimes referred to as "parison". The parison is typically fed into a space between the mating halves of a suitable die (not shown) and is blow-molded to form a desired product (e.g., a plastic container).

Thereafter the screw extruders or conveyors 12,12 are again operated to feed additional heated thermoplastic material through the openings 8,8 to again force the double walled piston 22 upwardly, and the above-described cycle is repeated again and again. Of course, the cycle of the extrusion apparatus 20 should be synchronized with the operation of the blow-molding apparatus (not shown) into which the parison from the ring nozzle 4 is fed.

It will be noted that the volume of material in the annular piston chamber 5 and the longitudinal channels 6,6 remains constant at all times, during downward movement of the double walled piston 22. This ensures that the thermoplastic material within the housing 1 will remain therein for a predetermined time during each cycle. This predetermined time is selected to ensure that the thermoplastic material in the housing becomes homogeneous and of the optimum consistency so that the resulting parison extruded through the ring nozzle 4 and the finished, blow-molded product will be of constant thickness and homogeneous.

Figure 4:
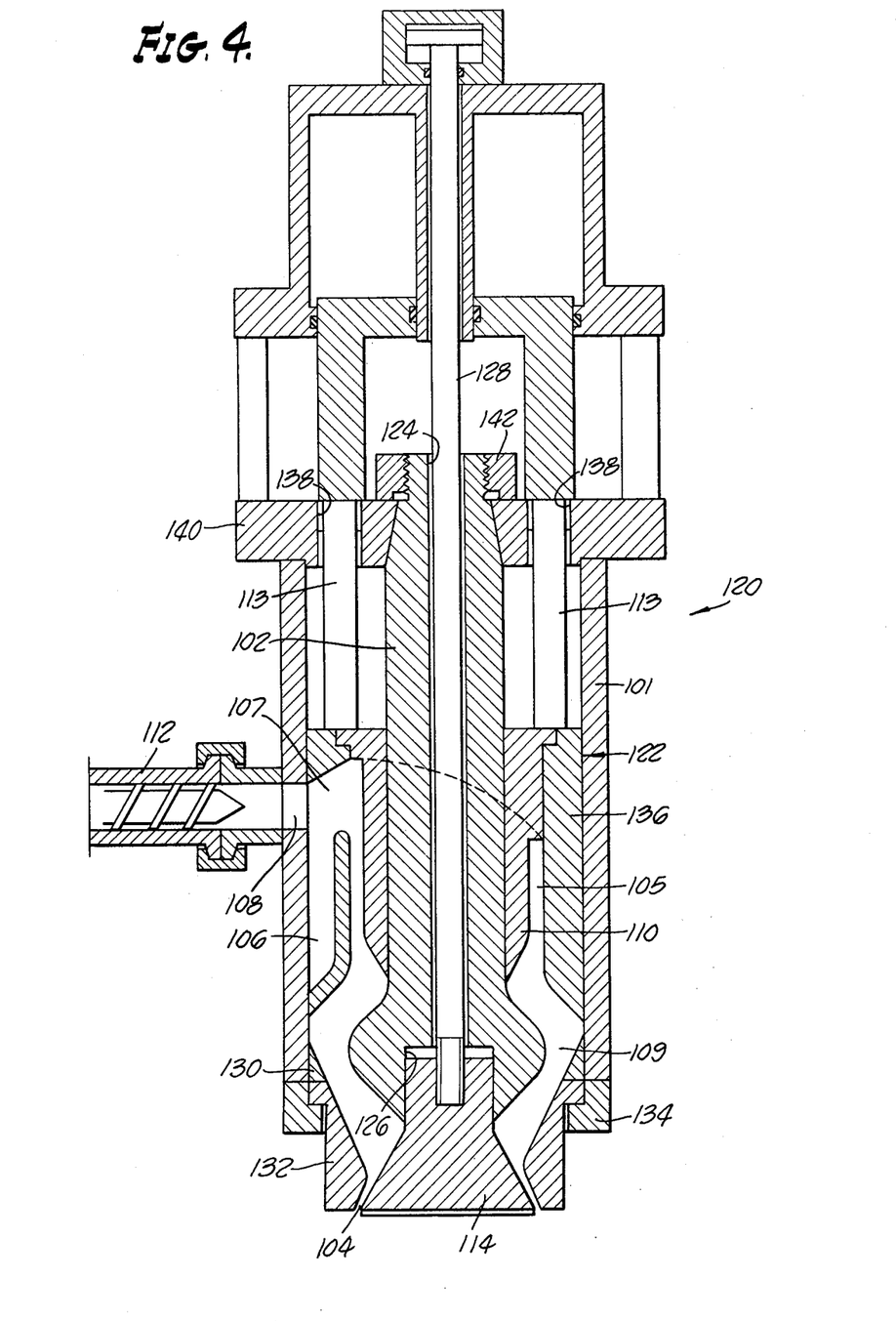
FIG. 4 is a sectional elevation view of a second embodiment of the apparatus of the present invention, showing the piston in its lowermost position.
Figure 5:
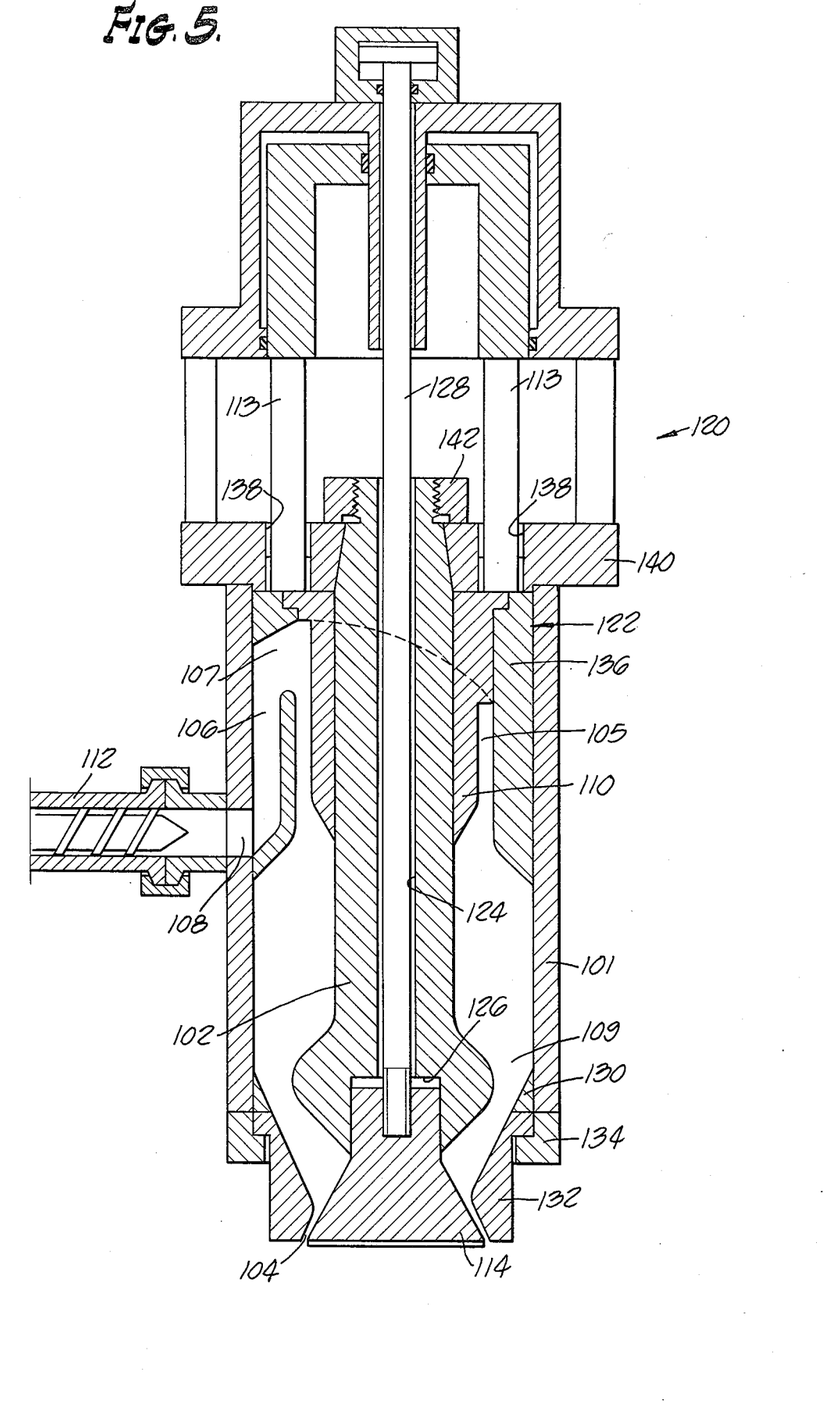
FIG. 5 is a sectional elevation view of the apparatus shown in FIG. 4 with the piston in its uppermost position.

Referring now to the embodiment of the extrusion apparatus of the present invention shown in FIGS. 4 and 5, it will be seen that the extrusion apparatus 120 includes a generally cylindrical housing 101, a longitudinal core 102 extending substantially co-axially through the center of the housing 101 and a double walled piston 122 slidably mounted for longitudinal sliding movement along the outer surface of the core 102.

The longitudinal core 102 is provided with a central longitudinal bore 124 extending substantially co-axially therethrough. The longitudinal bore 124 communicates with an enlarged, downwardly opening cavity 126 in the lower end of the core 102. A control shaft 128 is slidably disposed in the bore 124 and is connected at its lower end to the upper portion of a mandrel 114.

The upper end portion of the mandrel 114 is generally cylindrical and is slidably disposed in the cavity 126 in the lower end of the core 102. The lower portion of the mandrel 114 is of generally truncated cone-shaped. A two-piece die member 130,132 is mounted in the lower end of the cylindrical housing 101 by means of a suitable annular retaining member 134. The upper die piece 130 and the upper portion of the lower die piece 132 are disposed within the lower portion of the cylindrical housing 101. The lower portion of the lower die piece 132 extends downwardly and outwardly through the bottom of the housing 101.

As shown in FIGS. 4 and 5, the interior peripheral wall of the die 130,132 is generally truncated cone-shaped, except at the very lower end thereof to provide an annular storage chamber 109 between the interior die wall and the mandrel 114.

It will be noted that there is an annular space 104 defined by the lower outer peripheral surface of the mandrel 114 and the lower inner peripheral surface of the die member 132. This annular space 104 forms a ring nozzle through which soft thermoplastic material may be extruded to form a tubular length of soft thermoplastic material (i.e., a parison). It will be appreciated that the thickness of the tubular length of material extruded through the annular space or ring nozzle 104 may be increased by moving the control rod 128 and the mandrel 114 downwardly; and the thickness of the tubular material may be decreased by moving the control rod 128 and the mandrel 114 upwardly.

The double walled piston 122 of the extrusion apparatus 120 includes an inner, axially extending annular wall 110, and an outer, axially extending annular wall 36. An annular chamber 105 is formed between the inner piston wall 110 and the outer piston wall 136.

As shown in FIGS. 4 and 5, the double walled piston 122 is mounted for longitudinal sliding movement in the cylindrical housing 101. The piston 122 is movable between its uppermost position shown in FIG. 5 and its lowermost position shown in FIG. 4 by means of a plurality of piston rods 113,113. The piston rods 113,113 extend through openings 138,138 in an upper cover member 140. Thus, it will be appreciated that the double walled piston 122, which is attached to the lower ends of the piston rods 113,113, is confined to longitudinal sliding movement. Any attempt to rotate the piston in the housing 101 will be resisted by means of the piston rods 113,113 which extend through the openings 138,138 in the upper cover member 140.

It will also be noted, with reference to FIGS. 4 and 5, that the core member 102 is fixedly mounted relative to the housing 101 by means of cooperating external and internal screw threads on the upper portion of the core 102 and on a mounting member 142, respectively.

A screw-type extruder or conveyor 112 is connected to the housing 101, at about the central portion thereof, and communicates with the interior of the housing 101 via opening 108 in the housing 101.

A longitudinal channel 106 is provided in the exterior surface of the outer wall 136 of the piston 122. This channel 106 is in communication with the opening 108 and the screw extruder 112.

As shown in FIGS. 4 and 5, an opening or passage 107 is provided at the upper end of channel 106 to provide communication between the extruder 112, opening 108, channel 106, and the annular piston chamber 105.

It will be noted from a comparison of FIGS. 4 and 5 that the length of the stroke of piston 122 is substantially equal to the length of the longitudinal channel 106. It will be further noted, from viewing FIG. 5, that the size of the annular storage space 109 increases from a minimum volume when the piston 122 is in its lowermost position (FIG. 4) to a maximum volume when the piston is in its uppermost position (FIG. 5).

In operation, the double walled piston 122 is initially in its lowermost position shown in FIG. 4. The screw-type conveyor or extruder 112 is operated to feed soft heated thermoplastic material through the opening 108 to fill the annular piston chamber 105, the storage chamber 109 and the longitudinal channel 106.

As the soft thermoplastic material enters the upper portion of the annular piston chamber 105, through the opening 107, the material entering through opening 107 will be divided to flow around either side of the inner piston wall 110. The divided material from the extruder 112 and the opening 108 will rejoin an area which is spaced substantially 180° from the inlet opening 108.

It will be noted, as shown in broken lines in FIGS. 4 and 5, that the upper portion of the annular piston chamber 105 tapers from a high point adjacent the openings 107 and 108 to a low point spaced approximately 180° therefrom. This structure is provided to ensure that the soft thermoplastic material fed through the openings 107 and 108 will flow downwardly in the annular piston chamber 105 at a substantially constant, even rate. The thermoplastic material entering the chamber 105 through the opening 107 will start to flow downwardly immediately. By the time the divided material rejoins at the low point of the upper portion of chamber 105 (i.e., at an area spaced about 180° from the entry opening 107), the material which entered at the opening 107 will reach the same approximate horizontal plane. From that time on the material will all flow downwardly through the annular piston channel 105 and the storage chamber 109 at the same rate and in the same horizontal plane, thereby ensuring re-homogenization of the material.

When the annular piston chamber 105, the storage chamber 109 and the channel 106 have been filled with thermoplastic material, the introduction of additional thermoplastic material from the screw extruder 112 into the cylindrical housing 101 then forces the piston 122 upwardly to the uppermost position shown in FIG. 5. As the piston 122 moves upwardly, the storage space 109 is increased, as will be seen by a comparison of FIGS. 4 and 5.

When the double walled piston 122 has reached its uppermost position (FIG. 5), a suitable switch (e.g., a limit switch, conventional per se, not shown) is actuated to operate a suitable driving mechanism (not shown) to drive the piston rods 113,113 and the double walled piston 122 downwardly.

As the piston 122 moves downwardly, it will force the soft thermoplastic material in the lower portion of the storage chamber 109 through the annular opening or ring nozzle 104 to extrude a predetermined length of soft thermoplastic material therefrom. As noted above, this length of soft thermoplastic material is sometimes referred to as "parison". The parison is typically fed into a space between the mating halves of a suitable die (not shown) and is blow-molded to form a desired product (e.g., a plastic container).

Thereafter, the screw extruder or conveyor 112 is again operated to feed additional heated thermoplastic material through the opening 108 to again force the double walled piston 122 upwardly, and the above-described cycle is repeated again and again. Of course, the cycle of the extrusion apparatus 120 should be synchronized with the operation of the blow-molding apparatus (not shown) into which the parison from the ring nozzle 104 is fed.

It will be noted that the volume of material in the annular piston chamber 105 and the longitudinal channel 106 remains constant at all times, during downward movement of the double walled piston 122. This ensures that the thermoplastic material within the housing 101 will remain therein for a predetermined time during each cycle. This predetermined time is selected to ensure that the thermoplastic material in the housing becomes homogeneous and of the optimum consistency so that the resulting parison extruded through the ring nozzle 104 and the finished, blow-molded product will be of constant thickness and homogeneous.

It will be appreciated from the foregoing that the improved extrusion apparatus (or accumulator head) of the present apparatus ensures that the soft thermoplastic tube or parison extruded therefrom will be of substantially constant wall thickness and of optimum homogeneity. As a result, the product (e.g., a plastic container) which is subsequently blow-molded from the parison will be of improved strength and quality.

Of course, it is intended that numerous modifications, variations and additions may be made to the preferred embodiments of the present invention described above and shown in the drawings, without departing from the spirit and the scope of the invention. Accordingly, it is intended that the scope of this patent be limited only by the scope of the appended claims.

I claim:

1. An apparatus for extruding a tube of relatively soft thermoplastic material comprising;
   a generally cylindrical housing having an interior wall and a longitudinal axis;
   a generally cylindrical core member extending through at least a portion of said cylindrical housing and being co-axially aligned therewith; said core member having a longitudinal bore extending therethrough; said core member having a lower end provided with a downwardly opening cavity communicating with said longitudinal bore;
   a mandrel having an upper portion slidably disposed in said cavity in said lower end of said core member; said mandrel having an outwardly flaring lower portion extending downwardly through the lower end of said housing and terminating in an enlarged, generally circular bottom end;
   a generally annular die member having an upper end disposed within said lower end of said housing and a lower end extending downwardly through said lower end of said housing and surrounding said lower end of said mandrel;
   said lower ends of said die member and said mandrel defining an annular space therebetween;
   a control rod extending downwardly through said longitudinal bore in said core member and having a lower end connected to the upper end of said mandrel for moving said mandrel upwardly and downwardly;
   means defining an opening in the wall of said housing for receiving thermoplastic material;
   a double walled piston mounted in said housing for longitudinal sliding movement relative to said core member and said cylindrical housing; said double walled piston including: a generally annular, longitudinal extending outer wall; a generally annular, longitudinally extending inner wall; and means defining a generally semi-cylindrical, longitudinally extending channel in the outer surface of said outer wall;
   said inner and outer annular walls of said piston defining an annular piston chamber therebetween;
   said longitudinal channel having an open upper end in communication with said annular piston chamber; and
   said longitudinal channel communicating with said opening in said wall of said cylindrical housing.

2. An apparatus for extruding a tube of relatively soft thermoplastic material comprising:
   a generally cylindrical housing having an interior wall and a longitudinal axis;
   a generally cylindrical core member extending through at least a portion of said cylindrical housing and being co-axially aligned therewith;
   means defining an opening in the wall of said housing for receiving thermoplastic material;
   a double walled piston mounted in said housing for longitudinal sliding movement relative to said core member and said cylindrical housing; said double walled piston including: a generally annular, longitudinally extending outer wall; a generally annular, longitudinally extending inner wall; and means defining a generally semi-cylindrical, longitudinally extending channel in the outer surface of said outer wall;

said inner and outer annular walls of said piston defining an annular piston chamber therebetween;

said longitudinal channel having an open upper end in communication with said annular piston chamber; and said longitudinal channel communicating with said opening in said wall of said cylindrical housing.

3. An apparatus for extruding a tube of relatively soft thermoplastic material comprising:

a generally cylindrical housing having an interior wall and a longitudinal axis;

a generally cylindrical core member extending through at least a portion of said cylindrical housing and being co-axially aligned therewith;

means defining an opening in the wall of said housing for receiving thermoplastic material;

a double walled piston mounted in said housing for longitudinal sliding movement relative to said core member and said cylindrical housing; said double walled piston including: a generally annular, longitudinally extending inner wall and a generally annular, longitudinally extending outer wall, said annular walls being interconnected for unitary longitudinal sliding movement;

said inner and outer annular walls of said piston being mutually spaced to define an annular piston chamber therebetween;

said annular piston chamber communication with said opening in said wall of said cylindrical housing.

4. An apparatus according to claim 3, and further including a generally semi-circular, arc-shaped distributor member mounted on said inner wall of said piston.

5. An apparatus for extruding a tube of relatively soft thermoplastic material comprising:

a generally cylindrical housing having an interior wall and a longitudinal axis;

a generally cylindrical core member extending through at least a portion of said cylindrical housing and being co-axially aligned therewith; said core member having a longitudinal bore extending therethrough; said core member having a lower end provided with a downwardly opening cavity communicating with said longitudinal bore;

a mandrel having an upper portion slidably disposed in said cavity in said lower end of said core member; sand mandrel having an outwardly flaring lower portion extending downwardly through the lower end of said housing and terminating in an enlarged, generally circular bottom end;

a generally annular die member having an upper end disposed within said lower end of said housing and a lower end extending downwardly through said lower end of said housing and surrounding said lower end of said mandrel;

said lower ends of said die member and said mandrel defining an annular space therebetween;

a control rod extending downwardly through said longitudinal bore in said core member and having a lower end connected to the upper end of said mandrel for moving said mandrel upwardly and downwardly;

means defining a pair of diametrically opposed openings in the wall of said housing for receiving thermoplastic material;

a double walled piston mounted in said housing for longitudinal sliding movement relative to said core member and said cylindrical housing; said double walled piston including: a generally annular, longitudinal extending outer wall; a generally annular, longitudinally extending inner wall; and means defining a pair of diametrically opposed, generally semi-cylindrical, longitudinally extending channels in the outer surface of said outer wall;

said inner and outer annular walls of said piston defining an annular piston chamber therebetween;

each of said longitudinal channels having an open upper end in communication with said annular piston chamber; and each of said longitudinal channels communicating with one of said openings in said wall of said cylindrical housing.

6. In an apparatus for producing a length of tubular thermoplastic material, comprising a longitudinally extending housing and a core member extending at least partially through the central portion of said housing, and an annular piston mounted for longitudinal sliding movement in said housing, the improvement comprising said annular piston having an annular outer wall and an annular inner wall spaced from said outer wall to provide an annular piston chamber therebetween, said annular walls being fixedly related to each other for unitary sliding movement in said housing.

* * * * *